Oct. 4, 1966  V. O. NICOLAI  3,277,393
ADJUSTABLE FEEDBACK LASER MODULATOR
Filed March 18, 1963
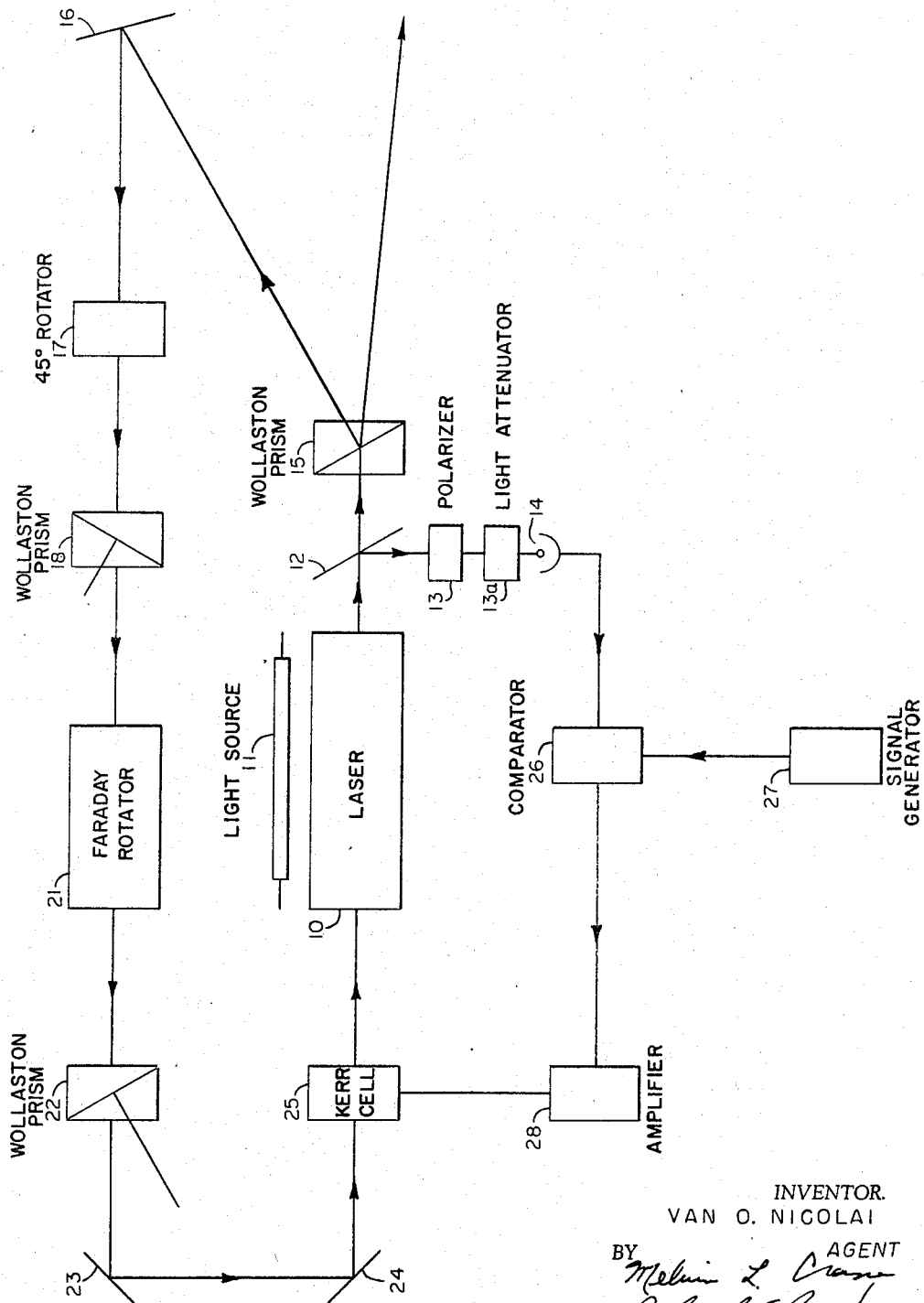
INVENTOR.
VAN O. NICOLAI
BY
AGENT
ATTORNEY

United States Patent Office 3,277,393
Patented Oct. 4, 1966

3,277,393
ADJUSTABLE FEEDBACK LASER MODULATOR
Van O. Nicolai, 275 S. Marengo, Pasadena, Calif.
Filed Mar. 18, 1963, Ser. No. 266,104
2 Claims. (Cl. 331—94.5)

The invention described herein may be manufactured and used by or for the Government of the United States of America for governmental purposes without the payment of any royalties thereon or therefor.

The present invention is a continuation-in-part of application Serial #221,390 filed Sept. 4, 1962, and relates to systems which make use of a laser and more particularly to a feedback laser amplifier for generating variable duration optical pulses.

A laser (light amplification by stimulated emission of radiation) sometimes referred to as optical maser, is a device capable of producing coherent radiation in the visible and infrared regions of the spectrum. A laser is a sensitive element comprising activator ions in a suitable matrix which in operation absorbs optical energy which pumps electrons from a ground state to a higher energy level, populating the higher energy level with electrons. The electrons in the higher energy level are unstable and quickly begin to return to another state such as the ground state. In the process of returning to the ground state, the electrons fall from the metastable or excited state to the ground or terminal state yielding normal luminescence. However, if the population of the excited state exceeds that of the terminal state, then stimulated emission of radiation can occur. Further stimulated emision of radiation takes place with a regenerative buildup in intensity. The further stimulated emission is always in phase with the exciting radiation. The laser element operates as a resonant cavity and only those modes of oscillation which are the natural modes for the system can be built-up to enhance coherent radiation.

The resonator currently used in laser work is of conventional Fabry-Perot construction in which the sensitive element is a rod having its ends quite flat and parallel and coated with a film of silver for reflecting and trapping the radiation. The silver coating on one end is opaque and on the other or outlet end the silver coating is thinner to provide a small amount of light transmission as the output of the laser. Optical pumping energy is provided along the length of the laser rod by use of a suitable high intensity source for example, a xenon flash tube or mercury discharge.

It is therefore an object of the present invention to provide a laser system in which the ends of the laser element are not silvered.

Another object of the present invention is to provide suitable control of the output of the laser by use of a controlled feedback system in order to eliminate unwanted spiking thereby permitting pulse durations of desirable lengths.

Still another object of the invention is to reduce scattering effects in a laser.

While still another object of the invention is to provide a laser system in which the major portion of the light passes through the laser only once.

A further object is to provide a single modulation control of a laser.

Yet another object is to provide a system which will produce different pulse amplitudes and different pulse durations which can be controlled.

Other objects and advantages of the invention will hereinafter become more fully apparent from the following description of a drawing, which illustrates the preferred embodiment, and wherein:

The drawing illustrates in block diagram a light amplification system including a laser with a suitable feedback system.

The present invention is directed to a light amplification system which includes a laser which is optically pumped by a light source to produce an output pulse and a feedback system for controlling the output. The greater percentage of the output light pulse is then directed through an appropriate optical focusing system which focuses the light to a narrow beam which may be used in welding, as a communication system, and other uses well known in the art. The system is provided with a light feedback system for reflecting a portion of the beam back through the length of the laser by suitable optical means and an electrical control circuit is associated with the light feedback system to control the pulse amplitude and pulse duration of the laser output pulse.

Now referring to the drawing, there is illustrated a light amplification system including a solid state laser element 10 formed and cut such that the optic axis and the cylindrical axis have 0° between them. The laser element is optically pumped by a suitable light source 11 such as a xenon flash tube or mercury discharge lamp in order to excite the atoms of the laser element sufficiently to produce a suitable light output pulse. The light output pulse of the laser element is directed onto a partially reflecting mirror 12 set at a 45° angle with the axis of the light output beam such that the mirror transmits the majority of the light beam on through the mirror while reflecting only a small portion of the light in a line at 90° with the axis of the laser element. The reflected portion of the light is directed through a polarizing element 13 and a variable light attenuator 13a on to a phototube 14 which converts the incident light into an electrical output signal which depends on the amount of incident light. The polarizer permits only a fraction of the recirculating component of the light to enter the photocell.

The light that passes through the partially reflecting mirror 12 is directed into a Wollaston prism which separates the incident light into two paths of different polarities, each of which continues on at a small angle with the axis of the incident light beam. The angular spread between the rays emerging from the Wollaston prism are greatly exaggerated on the drawing for purposes of clarity. The light beam that continues on through the Wollaston prism as the main beam is directed on through a suitable optical lens focusing system, not shown for simplification of the drawing, to provide a light beam which can be used for many purposes well known in the art. The light that emerges at an angle to the main beam is directed onto a fully reflecting mirror 16 which reflects the light back in a path which is parallel to the main pulsepath. The light is reflected through a quartz 45° rotator 17 to a second Wollaston prism 18. Since the beam is now properly polarized the second Wollaston prism does not polarize the incident light into two separate beams as before. From the second Wollaston prism the light is passed through a Faraday rotator 21 thence through a third Wollaston prism 22 onto successive fully reflecting mirrors 23, 24 positioned at 45° with the incident beam which directs the beam back toward the inlet end of the laser element. The beam is directed into a Kerr Cell 25 and through the Kerr Cell into the inlet end of the laser element. The effect on the light beam passing through the Kerr Cell depends on the voltage applied thereto such as is well known in the art.

The voltage applied to the Kerr Cell makes possible a control of the output beam pulse of the laser element. With proper adjustment of feedback parameters and with appropriate voltage changes on the Kerr Cell, many different pulse amplitudes and pulse durations may be produced. Such a control is provided by the output from the phototube 14 due to the light reflected from the laser output beam by the partially reflecting mirror 12. The electrical output of the phototube is directed into a comparator 26 where the signal is compared with a signal generated by an adjustable signal generating circuit 27. The difference in the signal from the phototube and the generated signal out of 27 is the output of the comparator 26 and is directed into an amplifier 28 where the signal is amplified and then directed to the Kerr Cell. Thus the phototube and generated signal operate as a servosystem error signal for the Kerr Cell. Any change of the applied voltage to the Kerr Cell effects the amount of light transmitted back to the laser. Thus the amplitude and duration of the laser output pulse can be controlled by adjusting the amplitude and duration of the generated pulse signal which, accordingly, affects the voltage applied to the Kerr Cell to control the amount of light passing through the Kerr Cell back to the laser. Thus the output pulse of the laser is controlled in both amplitude and duration. The polarized output light pulse from the laser material is prevented from traveling in a clockwise direction by the Wollaston prism 22, Faraday rotator 21, and Wollaston prism 18. Thus the light from the laser element in the feedback circuit can travel in only a counter-clockwise direction and is controlled automatically by the Kerr Cell in accordance to the output of the comparator.

Obviously many modifications and variation of the present invention are possible in the light of the above teachings. It is therefore to be understood that within the scope of the appended claims the invention may be practiced otherwise than as specifically described.

What is claimed is:

1. An adjustable feedback laser modulator system which comprises
    (a) a laser element,
    (b) light input and output ends on said laser element,
    (c) a light source for optically pumping said laser element to produce an output light beam,
    (d) a partially reflective mirror adjacent said output end positioned across the path of said output light beam,
    (e) said partially reflective mirror reflecting a small portion of said light beam in a path at right angles to said output light beam and passing the remainder of said light beam,
    (f) an optical means positioned in the path of said light beam passing through said partially reflective mirror,
    (g) said optical means polarizing said light beam and separating said light beam into a main polarized beam and a second polarized beam at an angle with respect to the main beam,
    (h) said main beam continuing on to perform a desired work function and said angularly directed beam being fed back through an optical feed-back system to the input end of said laser element,
    (i) said feedback system including in order in the direction of the path followed by said second polarized beam from said optical means to the inlet of said laser element; a fully reflecting mirror, a quartz 45° rotator, a Wollaston prism, a Faraday rotator, a second Wollaston prism, two successive fully reflecting mirrors and a Kerr cell, and
    (j) a Kerr cell control circuit operative by said small portion of said laser output beam reflected from said main beam by said partially reflective mirror in the path of the laser output beam.

2. An adjustable feedback laser modulator system as claimed in claim 1 wherein said Kerr cell control circuit includes
    (a) a photocell for receiving a portion of said small portion light beam reflected by said partially reflecting mirror and converting said light beam into an electrical signal which is directed into a comparator,
    (b) a generated signal means for directing a desired signal into said comparator,
    (c) an amplifier for receiving an output from said comparator representative of the difference between the signal from said generated signal means and said output signal from said photocell,
    (d) said amplifier directing said signal onto said Kerr cell for controlling the Kerr cell, and
    (e) said Kerr cell controlling the light through said feedback system into the input end of said laser element.

References Cited by the Examiner

FOREIGN PATENTS 1,228,868   3/1960   France.

OTHER REFERENCES

Electronics Newsletter, published in Electronics, vol. 35, No. 25, June 22, 1962, page 7.

JEWELL H. PEDERSEN, *Primary Examiner.*

SAMUEL FEINBERG, *Examiner.*

L. L. HALLACHER, *Assistant Examiner.*